(12) United States Patent
Mathison

(10) Patent No.: US 7,621,066 B1
(45) Date of Patent: Nov. 24, 2009

(54) FISHING ROD HOLDER

(76) Inventor: Matthew B. Mathison, 17338 Jade Ave., Lamberton, MN (US) 56152

(*) Notice: Subject to any disclaimer, the term of this patent is extended or adjusted under 35 U.S.C. 154(b) by 85 days.

(21) Appl. No.: 11/834,070

(22) Filed: Aug. 6, 2007

(51) Int. Cl.
*A01K 97/10* (2006.01)

(52) U.S. Cl. .................... 43/21.2; 224/922; 224/185; 224/200; 224/201

(58) Field of Classification Search .............. 43/21.2; 224/922, 200, 201, 266, 265, 185
See application file for complete search history.

(56) References Cited

U.S. PATENT DOCUMENTS

| | | | | |
|---|---|---|---|---|
| 507,481 A * | 10/1893 | Brooks | ...... | 224/200 |
| 603,964 A * | 5/1898 | Northrup | ...... | 224/190 |
| 877,802 A * | 1/1908 | Shuster | ...... | 224/200 |
| 903,682 A * | 11/1908 | Cumpston | ...... | 224/200 |
| 921,900 A * | 5/1909 | Shuster | ...... | 224/200 |
| 1,174,319 A * | 3/1916 | Hipwood | ...... | 224/922 |
| 1,179,063 A * | 4/1916 | Aldrete | ...... | 224/265 |
| 1,198,202 A * | 9/1916 | Drinkard | ...... | 43/21.2 |
| 1,370,768 A * | 3/1921 | Sperling | ...... | 224/201 |
| 1,399,683 A * | 12/1921 | Beavers | ...... | 224/200 |
| 1,451,732 A * | 4/1923 | Hipwood | ...... | 43/21.2 |
| 1,704,407 A * | 3/1929 | Rice | ...... | 224/200 |
| 1,719,695 A * | 7/1929 | Ferguson | ...... | 43/21.2 |
| 1,877,845 A * | 9/1932 | Gerline | ...... | 224/200 |
| 1,918,389 A * | 7/1933 | Gerline | ...... | 224/922 |
| 1,985,985 A * | 1/1935 | Gerline | ...... | 43/21.2 |
| 2,068,054 A * | 1/1937 | Haislip | ...... | 224/922 |
| 2,139,188 A * | 12/1938 | Haislip | ...... | 224/922 |
| 2,223,253 A * | 11/1940 | Hamilton | ...... | 224/189 |
| 2,271,136 A * | 1/1942 | Geiger | ...... | 224/922 |
| 2,298,694 A * | 10/1942 | Haislip | ...... | 224/922 |
| 2,499,117 A * | 2/1950 | Smith | ...... | 43/21.2 |
| 2,537,456 A * | 1/1951 | Goss | ...... | 224/922 |
| 2,576,624 A * | 11/1951 | Miller | ...... | 43/21.2 |
| 2,709,544 A * | 5/1955 | Barringer | ...... | 224/922 |
| 2,742,210 A * | 4/1956 | Bortz et al. | ...... | 224/922 |
| 2,742,211 A * | 4/1956 | Craft, Sr. | ...... | 224/922 |

(Continued)

FOREIGN PATENT DOCUMENTS

FR 2599939 A3 * 12/1987

(Continued)

*Primary Examiner*—Darren W Ark
(74) *Attorney, Agent, or Firm*—Haugen Law Firm PLLP; Frederick W. Niebuhr

(57) ABSTRACT

A fishing rod supporting device includes a frame assembly adapted to be worn like a vest. The assembly includes a pair of rigid frame members with curvilinear upper regions that overly the shoulders, and linear lower regions that overly the chest region. A front panel of the assembly is joined to the frame members by a pair of connecting members coupled adjustably to the frame member so that the frame assembly can be adjusted to the size of the user. A strap surrounds the waist and secures the front panel against the abdominal region. A coupling arm is mounted pivotally to the front panel. A receptacle at the free end of the arm travels in an arcuate path as the arm pivots, maintained at a predetermined working angle relative to the front panel. The receptacle is lined with an elastomer to provide a secure hold of a fishing rod at the handle. Elastomeric cushioning material is applied to inside surfaces of the frame members and front panel for increased user comfort.

16 Claims, 6 Drawing Sheets

U.S. PATENT DOCUMENTS

| | | | | |
|---|---|---|---|---|
| 2,756,954 A * | 7/1956 | Whitlow | 248/514 |
| 2,792,670 A * | 5/1957 | Haynes | 224/265 |
| 2,926,826 A * | 3/1960 | Conrad | 224/200 |
| 2,995,855 A * | 8/1961 | Bell | 43/21.2 |
| 3,282,482 A * | 11/1966 | Scharsu | 224/922 |
| 3,286,884 A * | 11/1966 | Long, Jr. | 222/131 |
| 3,554,203 A * | 1/1971 | Hall, Sr. | 135/16 |
| 3,556,365 A * | 1/1971 | Bull | 43/21.2 |
| 3,749,294 A * | 7/1973 | Johnston | 224/922 |
| 3,774,825 A * | 11/1973 | Schone et al. | 224/265 |
| 3,881,644 A * | 5/1975 | Demaline | 224/201 |
| 4,081,115 A * | 3/1978 | White et al. | 43/21.2 |
| 4,198,775 A * | 4/1980 | Leisner | 43/21.2 |
| 4,298,149 A * | 11/1981 | Gottschalk et al. | 224/201 |
| 4,387,839 A * | 6/1983 | Dranchak | 224/265 |
| 4,402,441 A * | 9/1983 | Jones et al. | 224/265 |
| 4,450,993 A * | 5/1984 | Ephraim | 224/265 |
| 4,559,735 A | 12/1985 | Batlick | |
| 4,587,757 A * | 5/1986 | Lirette | 43/21.2 |
| 4,799,610 A * | 1/1989 | Hsieh | 224/201 |
| 4,802,612 A * | 2/1989 | Anderson | 224/922 |
| 4,828,152 A * | 5/1989 | Pepping | 43/21.2 |
| 4,858,364 A * | 8/1989 | Butts | 43/21.2 |
| 4,986,536 A * | 1/1991 | Zane | 224/266 |
| 5,020,833 A | 6/1991 | Wardall | |
| 5,038,511 A * | 8/1991 | Gessner | 43/21.2 |
| 5,052,146 A * | 10/1991 | Resnick | 43/21.2 |
| 5,105,574 A | 4/1992 | Fast | |
| 5,115,598 A * | 5/1992 | Shaw | 43/21.2 |
| 5,142,809 A * | 9/1992 | O'Brien et al. | 43/21.2 |
| 5,184,797 A * | 2/1993 | Hurner | 43/21.2 |
| 5,220,704 A * | 6/1993 | Flynn et al. | 224/200 |
| 5,313,734 A * | 5/1994 | Roberts | 43/21.2 |
| 5,331,761 A * | 7/1994 | Kuthy | 43/21.2 |
| 5,386,932 A * | 2/1995 | Gross | 43/21.2 |
| 5,421,116 A | 6/1995 | Moon | |
| 5,437,122 A * | 8/1995 | Wilson | 43/21.2 |
| 5,446,989 A * | 9/1995 | Stange et al. | 43/21.2 |
| 5,460,306 A * | 10/1995 | Rudd | 43/21.2 |
| 5,464,137 A * | 11/1995 | Shirdavani | 224/265 |
| 5,520,312 A * | 5/1996 | Maddox | 43/21.2 |
| 5,571,228 A * | 11/1996 | McMurtrie | 43/21.2 |
| 5,573,158 A * | 11/1996 | Penn | 224/265 |
| 5,697,183 A * | 12/1997 | Walker | 43/21.2 |
| 5,732,500 A | 3/1998 | Fitzpatrick | |
| 5,813,162 A * | 9/1998 | Tse et al. | 43/21.2 |
| 5,950,886 A * | 9/1999 | Maupin | 224/262 |
| 5,954,253 A * | 9/1999 | Swetish | 224/631 |
| 5,956,883 A * | 9/1999 | Krouth et al. | 43/21.2 |
| 6,003,746 A * | 12/1999 | Richardson | 43/21.2 |
| 6,112,449 A * | 9/2000 | Blackwell | 43/21.2 |
| 6,122,770 A | 9/2000 | Mathison | |
| 6,141,898 A * | 11/2000 | Shelton | 43/21.2 |
| 6,209,253 B1 * | 4/2001 | Saldana, Jr. | 43/21.2 |
| 6,237,821 B1 * | 5/2001 | Owen | 43/21.2 |
| 6,357,166 B1 * | 3/2002 | Malmanger et al. | 43/21.2 |
| 6,421,948 B1 * | 7/2002 | Craig | 43/21.2 |
| 6,449,895 B1 | 9/2002 | Zabihi | |
| 6,497,067 B1 * | 12/2002 | King | 43/21.2 |
| 6,591,540 B1 * | 7/2003 | Chargois | 43/21.2 |
| 6,591,542 B1 * | 7/2003 | Jordan | 43/21.2 |
| 6,619,521 B2 * | 9/2003 | Hadley | 224/190 |
| 6,646,557 B2 * | 11/2003 | Brake | 43/21.2 |
| 6,764,231 B1 * | 7/2004 | Shubert | 396/419 |
| 6,923,357 B2 * | 8/2005 | Smith | 43/21.2 |
| 6,962,018 B1 * | 11/2005 | King | 43/21.2 |
| 7,013,596 B1 * | 3/2006 | Moore | 43/21.2 |
| 7,047,688 B2 * | 5/2006 | Sandman, Jr. | 43/21.2 |
| 7,146,763 B1 * | 12/2006 | Stanton | 43/21.2 |
| 7,210,263 B2 * | 5/2007 | Franke | 43/21.2 |
| 7,276,653 B2 * | 10/2007 | Shimada | 224/265 |
| 7,296,377 B2 * | 11/2007 | Wilcox et al. | 43/21.2 |
| 7,394,008 B2 * | 7/2008 | May | 224/265 |
| 2003/0230023 A1 * | 12/2003 | Lu | 43/21.2 |
| 2005/0040193 A1 * | 2/2005 | May | 224/201 |
| 2006/0175365 A1 * | 8/2006 | Sandler | 224/265 |
| 2006/0186151 A1 * | 8/2006 | May | 224/265 |
| 2007/0169394 A1 * | 7/2007 | Keller | 43/21.2 |
| 2009/0045235 A1 * | 2/2009 | May | 224/265 |
| 2009/0084019 A1 * | 4/2009 | Carnevali | 43/21.2 |

FOREIGN PATENT DOCUMENTS

| | | | |
|---|---|---|---|
| GB | 2039701 A * | 8/1980 |
| GB | 2048633 A * | 12/1980 |
| GB | 2113982 A * | 8/1983 |
| GB | 2123675 A * | 2/1984 |
| GB | 2274049 A * | 7/1994 |
| JP | 02013339 A * | 1/1990 |
| JP | 2000157135 A * | 6/2000 |
| JP | 2001037391 A * | 2/2001 |
| JP | 2001299174 A * | 10/2001 |
| JP | 2002017226 A * | 1/2002 |
| JP | 2002153191 A * | 5/2002 |
| JP | 2002209494 A * | 7/2002 |
| JP | 2002306040 A * | 10/2002 |
| JP | 2006314290 A * | 11/2006 |
| JP | 2008011776 A * | 1/2008 |

\* cited by examiner

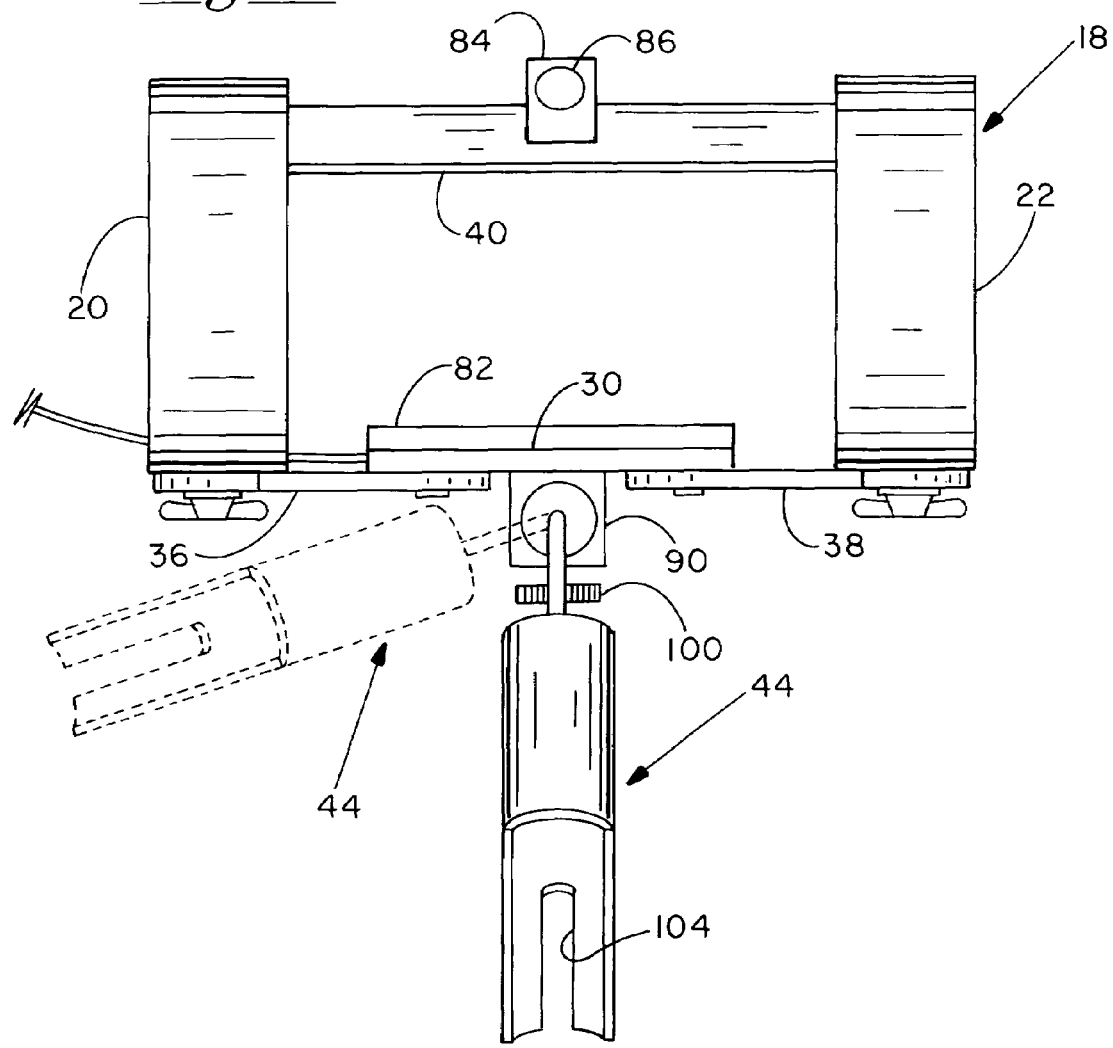

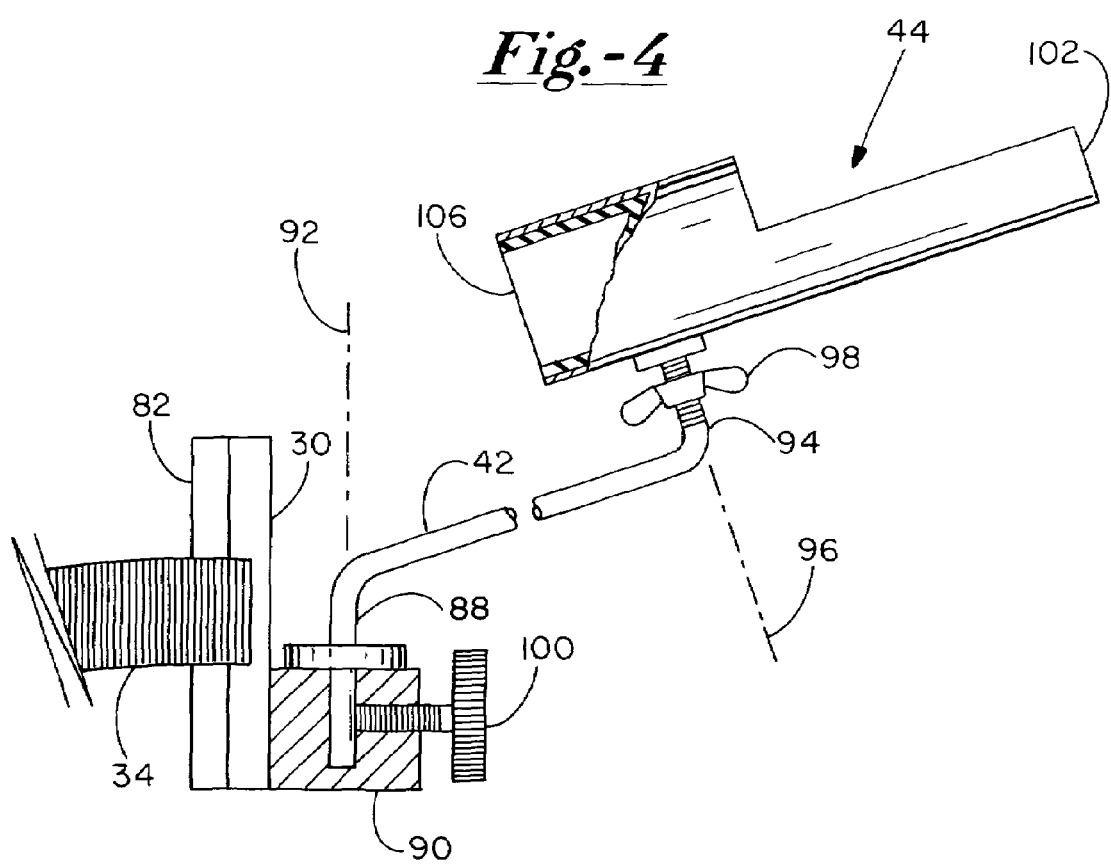

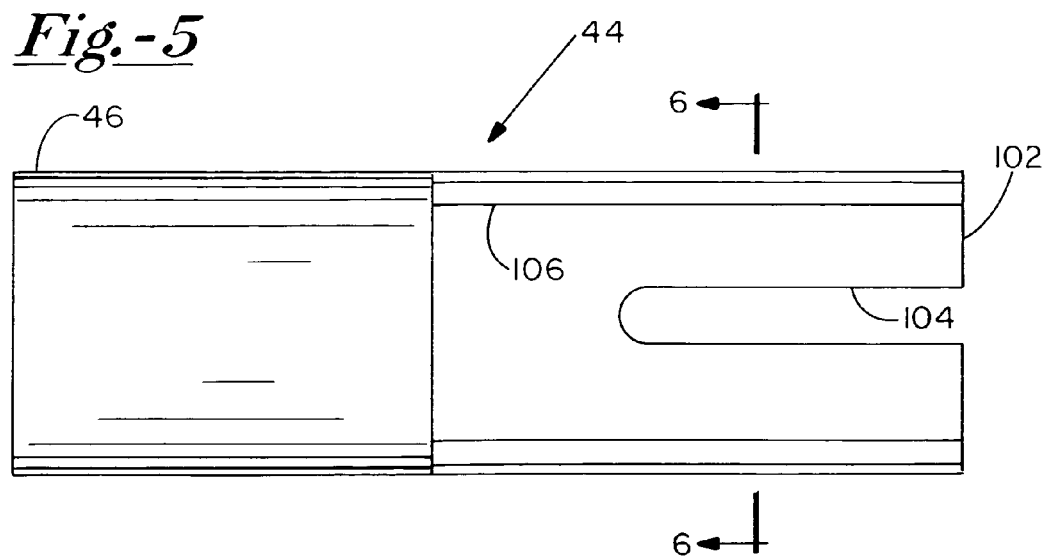
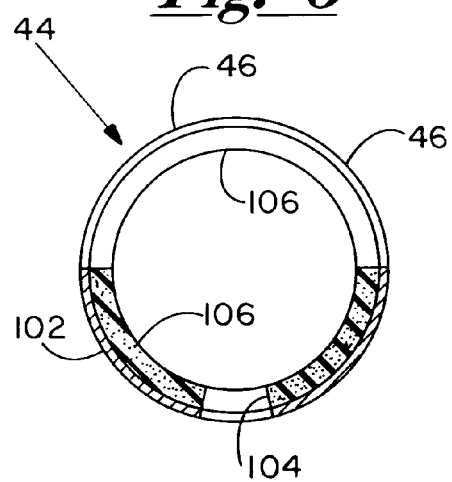

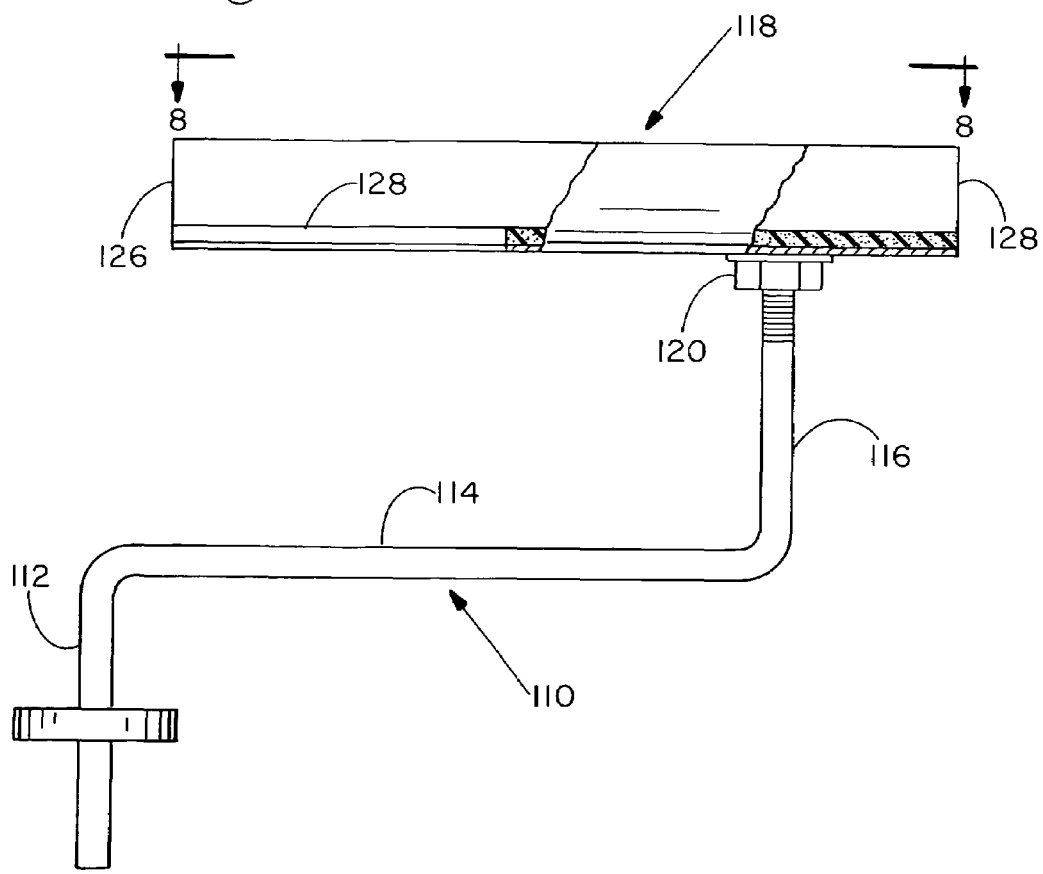
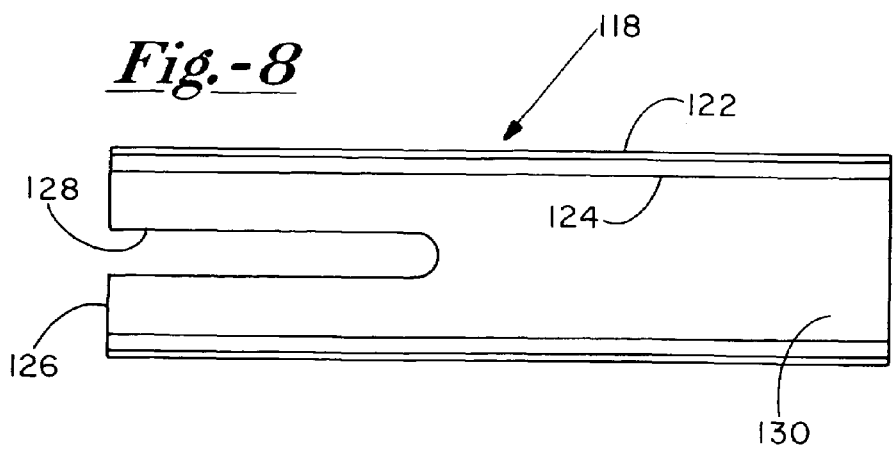

FISHING ROD HOLDER

BACKGROUND OF THE INVENTION

The present invention relates to fishing equipment, and more particularly to devices designed to provide alternative or additional support for fishing rods.

Fishing precedes the dawn of recorded history, and over many centuries has evolved from being exclusively a source of food for survival, to a source of recreation and enjoyment for millions of individuals, especially in more industrialized societies. Most of these individuals use a fairly standard fishing rod which includes a flexible rod or staff, a handle at one end of the staff that is gripped by hand, and a fishing line, typically wound on a reel attached to the rod near the handle.

Over the years, many implements have been developed for supporting a fishing rod handle, whether to assist individuals with physical disabilities that render holding the handle in the standard fashion difficult or impossible, to provide users with temporary relief from the task of holding the rod, or to provide auxiliary support for better control when attempting to reel in a fish offering spirited resistance. One common approach is to provide handle holding receptacles along a boat gunwale or rail. While these arrangements may provide relief from holding the fishing rod, they are of little use in actively engaging and reeling in a fish.

A variety of auxiliary arrangements are designed to support the rod with respect to the user rather than to the boat. For example, U.S. Pat. No. 5,520,312 (Maddox) discloses a rigid frame that includes an upwardly inclined receptacle for a fishing rod handle. The frame is supported on the user by a strap arrangement including an over-the-shoulder strap and one or more straps secured to the user's waist.

U.S. Pat. No. 4,081,115 (White, et al.) shows a support belt worn around the user's waist, with a receptacle mounted to the front of the belt to receive a fishing rod handle. Similarly, in U.S. Pat. No. 5,105,574 (Fast), a fishing rod holder includes a receptacle and a hook portion adapted for attachment to the users clothing, e.g. a belt.

Another arrangement, featured in U.S. Pat. No. 6,141,898 (Shelton), includes a pad designed to rest against the upper leg, and an extension above the pad and outwardly inclined to provide a fishing rod handle receptacle. The user secures the device with a strap that surrounds the waist, and may also use the strap about the pad and leg.

While these devices are useful for their intended purposes, to varying degrees these devices contemplate the use of both hands to guide and control the fishing rod. In some cases this is because the receptacle, while carried by the body, remains free for swinging or other motion relative to the body. In other cases, the receptacle itself is designed to support the handle only in cooperation with the user's hand or hands, and cannot by itself integrally support the fishing rod. Thus, these devices contemplate using two hands to reel in a fish, one to guide the rod while the other operates the reel. Further, none of these devices involves mounting a fishing rod handle receptacle for movement between an extended position for use, and a loading position for more convenient insertion of the handle.

Accordingly, the present invention has several aspects directed to one or more of the following objects:

to provide a device that enables users to support fishing rods in a completely hands-free manner, even while the fishing rod is in use and the hook and bait are in the water;

to provide a firm, substantially integral support of a fishing rod with respect to a user's torso, to enable the user to control the position of the fishing rod by pivoting or otherwise moving the torso;

to provide a fishing rod support device with a receptacle that is moveable between an extended position for use and a loading position for more convenient loading and removal of a fishing rod handle from the receptacle; and to provide a fishing rod supporting device that incorporates means for adjusting a working position of the fishing rod relative to the user's torso.

SUMMARY OF THE INVENTION

To achieve these and other objects, there is provided a device for supporting a fishing rod relative to a user's torso. The device includes a support frame assembly. The frame assembly comprises a substantially rigid first frame member having a first curvilinear upper region adapted to overlie a first shoulder of a user, and a substantially linear lower region adapted to overlie a chest region of a user in a frame assembly working position with the first curvilinear region supported by the first shoulder. The frame assembly further includes a substantially rigid second frame member having a second curvilinear upper region adapted to overlie a second, opposite shoulder of a user, and a second substantially linear lower region adapted to overlie a chest region of a user in the frame assembly working position with the second curvilinear region supported by the second shoulder. The frame assembly further comprises a substantially flat and rigid panel. A connecting structure fixes the panel with respect to the first and second frame members, to position the panel in a generally upright orientation and in overlying relation to an abdominal region of a user in the frame assembly working position. An elongate receptacle is adapted to integrally and releasably hold a handle of a fishing rod. A coupling structure secures the receptacle integrally and at a predetermined angle relative to the panel to enable a user, with the frame assembly in the working position, to control a location of a fishing rod so held in the receptacle through selective torso movement.

An advantage of this arrangement resides in the integral coupling of the receptacle, panel, connecting structure and frame members, enabling the user to exert control over the fishing rod position. For example, the user can remain still to hold the fishing rod substantially stationary, or swing the fishing rod to the right by rotating the torso, in particular bringing the left shoulder forward while moving the right shoulder backward. The frame assembly components are sufficiently rigid to support the fishing rod for movement with the torso, a feature not present in arrangements that rely on more pliable components such as belts and straps.

The rigid frame assembly components positively locate the fishing rod, without requiring the user to steady the rod with his or her hand. In addition, the user can reel in a fish using one hand to operate the reel without having to steady the rod with the other hand. To some anglers, this may be no more than an added convenience that enhances the fishing experience. For others, whether suffering from a temporary injury or a permanent physical disability that renders use of an arm difficult or impossible, the arrangement affords the possibility of reeling in a fish.

The preferred connecting structure comprises elongate, substantially rigid first and second connecting members connected to the panel and to the first and second frame members, respectively. The connecting members and frame members can be coupled in a manner that allows adjustments to the distances between the frame members and the panel, so that the frame assembly can accommodate users of different heights.

To more securely retain the panel in its overlying relation to the abdominal region, an arrangement of one or more straps can be used to surround the torso at the waist. In addition, resilient cushioning material is advantageously mounted to the frame members and panel, to be disposed between these components and the torso of a user wearing the frame assembly.

Another aspect of the present invention is an apparatus for adjustably supporting a fishing rod. The apparatus includes a frame assembly adapted for a removable mounting to a user's torso in a working position, in which a front panel of the frame assembly is generally upright and overlies an abdominal region. The apparatus further includes a receptacle adapted to integrally and releasably hold a handle of fishing rod. A coupling structure is provided for supporting the receptacle at a predetermined working angle relative to the panel, and for movement relative to the panel along an arcuate path between a loading position relatively proximate a torso of a user, and an extended position relatively remote from a torso.

The preferred coupling structure comprises an elongate coupling arm having a proximal end supported for pivoting relative to the front panel about a pivot axis that is substantially vertical in the frame assembly working position. At its distal end, the coupling arm supports the receptacle at the predetermined working angle. This allows the user to swing the coupling arm to a loading position that places the receptacle close to the body for easier loading of the fishing rod handle into the receptacle. After loading, the user pivots the coupling arm to the extended position in which the receptacle, now relatively remote from the body, points the fishing rod forwardly away from the user. An arm locking component is operable to secure the coupling arm at either the loading position or the extended position, and further may be used to secure the arm at an intermediate location between the extended and loading positions if desired.

Regardless of where the coupling arm is secured, it functions in cooperation with the frame assembly to afford positive control of the fishing rod location merely by moving the torso. Again, while affording a convenience to many users, for users subject to an injury or physical disability the arrangement can afford the possibility of fishing and considerably enhance enjoyment of the fishing experience.

IN THE DRAWINGS

For a further understanding of the foregoing and other features and advantages, reference is made to the following description and the drawings, in which:

FIG. 3 is a top plan view of the holding device;

FIG. 4 is a side elevation showing part of the device including a front panel, receptacle and coupling arm;

FIG. 5 is a top plan view of the receptacle;

FIG. 6 is a sectional view taken along the line 6-6 in FIG. 5;

FIG. 7 is a side elevation of an alternative coupling arm and receptacle to support a fishing rod; and FIG. 8 is an enlarged top plan view of the receptacle.

DETAILED DESCRIPTION OF THE PREFERRED EMBODIMENTS

Figure 1:
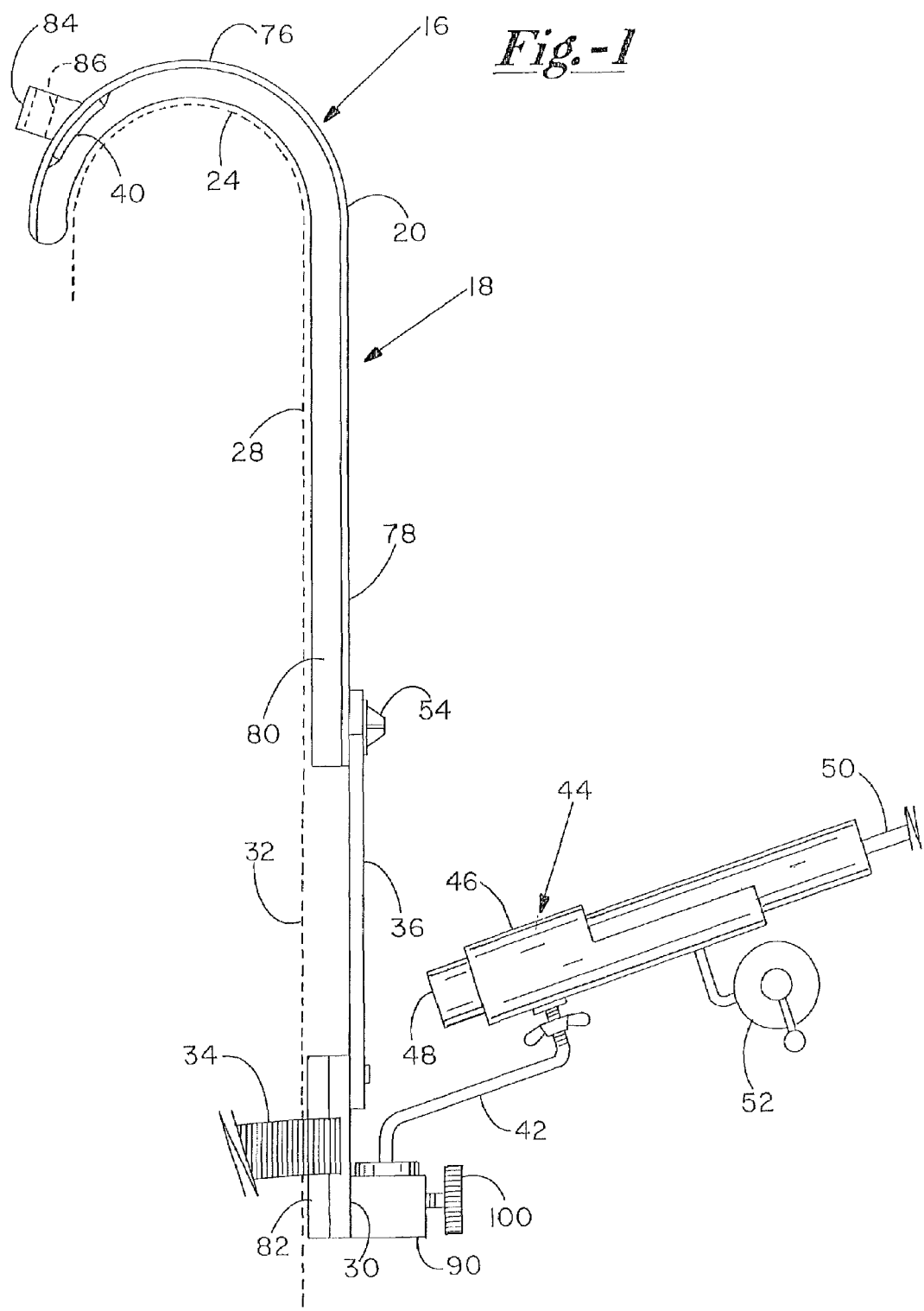
FIG. 1 is a side elevation of a fishing pole holding device constructed in accordance with the present invention.
Figure 2:
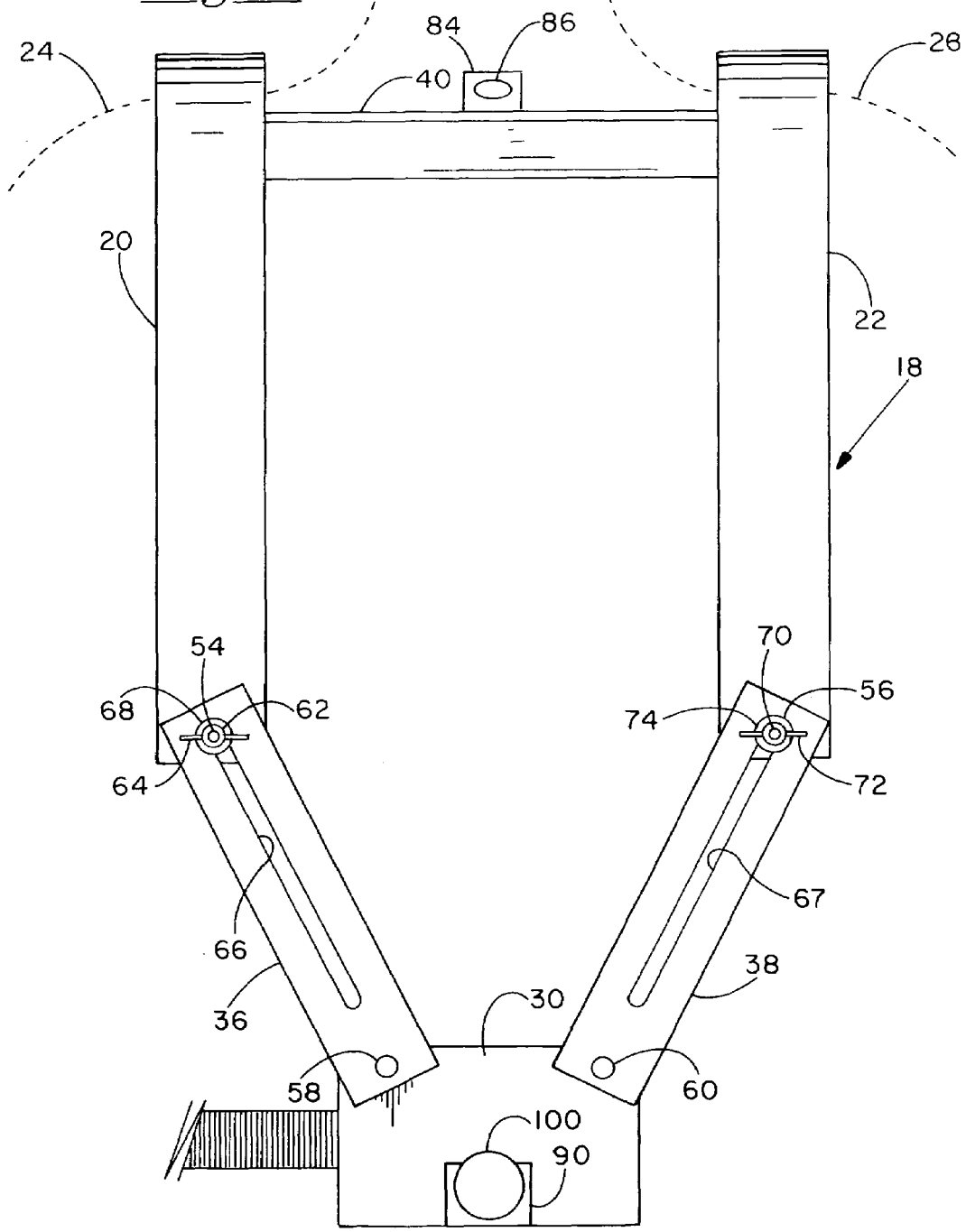
FIG. 2 is a frontal elevation of the holding device with a receptacle and arm removed.

Turning now to the drawings, there is shown in FIGS. 1-3 a fishing pole supporting device 16 for supporting a conventional fishing rod. The device includes a frame assembly 18 worn by the user in the manner of a vest about the torso. More particularly, opposite-side frame members 20 and 22 overlie opposite shoulders indicated in broken lines at 24 and 26. Lower regions of the frame members overlie the user's chest, indicated at 28. A front panel 30 of the frame assembly overlies the abdominal area indicated at 32, preferably held against the abdominal area by an inextensible strap 34 that surrounds the user's waist. Strap 34 can have a width of about ¾ of an inch, or more generally in the range of ¾ to 1 inch.

Additional components of frame assembly 18 include elongate connecting members 36 and 38 connecting front panel 30 to frame members 20 and 22, respectively. An elongate rear brace 40 couples frame members 20 and 22 to complete the frame assembly.

A coupling arm 42, supported pivotally relative to front panel 30, supports at its free end an elongate, cylindrical receptacle 44.

As seen in FIG. 1, the receptacle is configured to releasably hold a fishing rod. A rear portion 46 of the receptacle closely surrounds a handle 48 of the fishing rod, while the remainder of the receptacle partially surrounds and accommodates the handle and reel seat of the fishing rod. A portion of a rod blank or shaft 50 is shown extending from the receptacle, along with a reel 52 suspended from the reel seat and disposed below the receptacle.

As best seen in FIG. 2, a fastener 54 couples connecting member 36 to frame member 20, and a similar fastener 56 couples connecting member 38 to frame member 22. Connecting members 36 and 38 are joined to front panel 30 by respective fasteners 58 and 60 which allow the connecting members to pivot relative to the front panel. To more clearly show these features, arm 42 and receptacle 44 are not shown in this figure.

Fastener 54 includes a threaded shaft 62 integral with frame member 20, and a wing nut 64. When the threaded shaft extends through a slot 66 formed along connecting member 36 the wing nut can be tightened onto the shaft, preferably against a washer 68, to releasably and integrally secure connecting member 36 to frame member 20. By selectively positioning shaft 62 along slot 66, the distance between frame member 20 and front panel 30 can be adjusted to suit different users.

In similar fashion, a threaded shaft 70, wing nut 72 and washer 74 can be used to releasably secure connecting member 38 through a slot 67 to frame member 22. The pivotal connections between the connecting members and front panel accommodate this adjustment to suit users of different sizes.

Frame members 20 and 22 can be formed of metal or a durable plastic, and preferably have a length of about 18 inches and a width of about 2½ inches. The thickness can be in the range of 1/16 to ⅛ of an inch, sufficient to provide the desired rigidity but not so much as to add unnecessary weight. As seen in FIG. 1 with respect to frame member 20, each of the frame members has a curvilinear upper region 76 shaped to overlie the shoulder, and a substantially linear lower region 78 intended to overlie the chest region. A cushioning or padding layer 80, preferably a resilient elastomer in the nature of sponge rubber, is adhered to an inside surface of frame member 20 and thus is disposed between the frame member and the body of the user wearing device 16. A similar elastomeric layer is adhered to frame member 22. Likewise, an elastomeric cushioning layer 82 is adhered to an inside surface of front panel 30, to be disposed between the user and the front panel.

A bracket 84 is welded or otherwise secured to brace 40, centrally located between frame members 20 and 22. A threaded socket 86 is formed in the bracket to receive a shaft that supports, for example, an umbrella or other shading device for the user planning to spend an extended time outdoors.

With reference to FIGS. 3 and 4, coupling arm 42 has a proximal end 88 mounted to rotate relative to front panel 30 within a support 90 integral with the front panel. The pivot axis, indicated at 92 in FIG. 4, is parallel to a major plane of the front panel, and is substantially vertical when the front panel is upright.

At a forward or distal end 94, the coupling arm is threaded to support receptacle 44 for rotation relative to the arm about a pivot axis 96 aligned with the distal end region. A locking member 98, preferably a lock nut or wing nut, can be tightened against receptacle 44 to fix its angular position relative to arm 42. Likewise, a locking member 100 can be tightened to fix the angular position of arm 42 relative to front panel 30.

Thus, coupling arm 42 can be pivoted to move receptacle 44 along an arcuate path between an extended position (solid lines) for fishing, and a retracted position (shown in phantom in FIG. 3) in which the receptacle is closer to the body for more convenient loading of the fishing rod handle into receptacle 44 and later removal of the handle.

Further, by selectively locating receptacle 44 when tightening locking member 98, the receptacle can be angularly offset relative to coupling arm 42 as shown in phantom in FIG. 3. This offset capability is universal in the sense that the receptacle can be offset to suit either left handed or right handed users.

As seen from FIGS. 5 and 6, the wall forming receptacle 44 is continuous along proximal or rear portion 46 to provide an annular wall section that surrounds the handle of a fishing rod seated in the receptacle. Forwardly of region 46, the receptacle wall extends around approximately half of the receptacle circumference. Finally, along a forward or distal region 102, the receptacle includes a slot 104 designed to accommodate the reel mounting structure. A resilient layer 106 is adhered to the receptacle wall along its inside surface, and is under elastic compression when a fishing rod handle and reel seat are inserted into the receptacle. As a result, the receptacle firmly grips these components. As an alternative, the resilient layer could be applied over the entire receptacle, e.g. by dip coating.

The capacity to firmly hold the fishing rod, combined with the integral mounting of the receptacle to frame assembly 18 (specifically, front panel 30) and the rigidity of the frame assembly, afford several advantages not available in previous fishing rod support structures. First, a user is able to exert positive control over the position of the fishing rod without using the hands and arms, simply by selectively positioning the torso. In particular, whether or standing or seated, the user can swing the fishing rod to the left or right by pivoting the torso through simultaneous forward and rearward movement of the opposite shoulders. This result is achieved through a close fit of frame members 20 and 22 about the shoulders, together with use of strap 34 to secure front panel 30 against the abdomen. Frame assembly 18 moves with the body. Accordingly, a fishing rod supported in receptacle 44 moves with the body as well.

Another favorable result of the firm support is that a reel such as reel 52 can be operated to wind the fishing line, and therefore reel in a fish, without the need to grip the handle or other part of the fishing rod with the other hand. The grip provided by receptacle 44 is sufficient to steady the rod during winding of the reel.

Because of the foregoing features, an individual subject to a physical disability that hinders or prevents use of a hand or arm, nonetheless is able to control the position of a fishing rod, and reel in a fish using one hand. For users not subject to such disabilities, the foregoing features enable the user to fish for extended periods of time without the need to continually support the fishing rod by hand. For example, a user in waders, standing in the middle of the stream, can use both hands to attach a leader or fly while the fishing rod is held in receptacle 44.

FIGS. 7 and 8 illustrate an alternative support arrangement for fly fishing, in particular a coupling arm 110 having a proximal end 112 removably insertable into support 90 in lieu of coupling arm 42. Coupling arm 110 includes a generally horizontal or slightly inclined forward extension 114, and a generally upright extension 116 at a distal end of the forward extension.

A receptacle 118 is mounted to the coupling arm, secured at an upper end of the distal extension by a lock nut 120. Receptacle 118 is elongate, with a semicircular transverse profile similar to the profile of the distal region of receptacle 44.

As seen in FIG. 8, receptacle 118 includes a rigid outer wall portion 122 and a resilient layer 124 adhered to the outer wall portion. Along a proximal region 126, receptacle 118 includes a slot 128 similar to slot 104 in receptacle 44 to accommodate a reel mounting structure.

In contrast to receptacle 44, receptacle 118 is oriented to position slot 128 facing and open to the torso of the user. The additional height of upright extension 116 is provided to accommodate a reel between receptacle 118 and forward extension 114. If desired, a distal region 130 of receptacle 118 can be formed with an annular profile to contain a fishing rod. Alternatively, straps or other means can be used to secure the rod within the receptacle.

Thus in accordance with the present invention, a fishing rod can be supported in a manner that frees the user's hands and arms for other activity while allowing the position of the fishing rod to be positively controlled through movement of the torso. A receptacle configured to firmly hold the fishing rod handle can be moved between an extended position for use and a retraction position for more convenient insertion and removal of the fishing rod handle into and out of the receptacle. In general, use of the device offers to all users more convenience and therefore a better fishing experience. To those subject to a temporary or permanent physical disability, the device offers the possibility of the fishing experience without the need for outside assistance, or with minimal assistance.

What is claimed is:

1. A device for supporting a fishing rod relative to a user's torso, including:

a support frame assembly comprising a substantially rigid first frame member having a first curvilinear upper region adapted to overlie a first shoulder of a user and a substantially linear lower region adapted to overlie a chest region of a user in a frame assembly working position with the first curvilinear region supported by the first shoulder, and a substantially rigid second frame member having a second curvilinear upper region adapted to overlie a second, opposite shoulder of a user and a second substantially linear lower region adapted to overlie a chest region of a user in the frame assembly working position with the second curvilinear region supported by the second shoulder;

said frame assembly further comprising a substantially flat and rigid panel, and a connecting structure for fixing the panel with respect to the first and second frame members to position the panel in a generally upright orientation and in overlying relation to an abdominal region of a user in the frame assembly working position, wherein the connecting structure comprises an elongate, substantially rigid first connecting member pivotally connected to the panel, an elongate substantially rigid second connecting member pivotally connected to the panel, a first connecting component for securing the first connecting member integrally and releasably to the first frame member, and a second frame member connecting component for securing the second connecting member integrally and releasably to the second frame member, first and second elongate slots formed through the first and second connecting members, respectively, wherein each of the first and second connecting components extends through its associated one of the slots and is selectively positionable along the length of its associated slot to secure the associated connector member and frame member, whereby the first and second connecting components are operable to selectively adjust a distance between the panel and the first frame member and a distance between the panel and the second frame member;

an elongate receptacle adapted to integrally and releasably hold a handle of a fishing rod; and a coupling structure for securing the receptacle integrally and at a predetermined working angle relative to the panel to enable a user, with the frame assembly in the working position, to control a location of a fishing rod so held in the receptacle through selective torso movement.

2. The device of claim 1 wherein:

the coupling structure comprises a coupling arm having a proximal end supported for pivotal movement relative to the panel about a pivot axis substantially vertical in the frame assembly working position, the coupling arm further having a radially outward distal end supporting the receptacle at said working angle whereby the arm is pivotable about the pivot axis to carry the receptacle along an arcuate path between a loading position and an extended position.

3. The device of claim 2 further including:

an arm locking component operable to alternatively secure the coupling arm in the extended and loading positions.

4. The device of claim 1 further including:

a fastening component adapted to secure the panel in said overlying relation to the abdominal region.

5. The device of claim 4 wherein:

the fastening component comprises a substantially inextensible strap arrangement adapted to substantially surround a torso.

6. The device of claim 1 further including:

resilient cushioning material mounted to the frame members and the panel, and adapted to be disposed between the frame assembly and a torso of a user when in the frame assembly working position.

7. The device of claim 1 further including:

a substantially rigid brace member coupled to the curvilinear regions of the first and second frame members and disposed along a back region of a torso, when in the frame assembly working position.

8. The device of claim 1 wherein:

the receptacle is slotted to accommodate a reel mounted to a fishing rod so held in the receptacle.

9. An apparatus for adjustably supporting a fishing rod, including:

a frame assembly adapted for removable mounting to a user's torso in a working position in which a front panel of the frame assembly is generally upright and overlies an abdominal region, wherein the frame assembly includes:

a substantially rigid first frame member having a curvilinear upper region adapted to overlie a first shoulder of a user and a substantially linear lower region adapted to overlie a chest region of a user in said working position with the first curvilinear region supported by the first shoulder;

a substantially rigid second frame member having a curvilinear upper region adapted to overlie a second shoulder of a user and a substantially linear lower region adapted to overlie a chest region of a user in said working position with the second curvilinear region supported by the second shoulder; and a connecting structure for fixing the panel with respect to the first and second frame members, the connecting structure comprises an elongate, substantially rigid first connecting member connected to the panel, an elongate substantially rigid second connecting member connected to the panel, a first connecting component for securing the first connecting member integrally and releasably to the first frame member, and a second connecting component for securing the second connecting member integrally and releasably to the second frame member;

a receptacle adapted to integrally and releasably hold a handle of a fishing rod; and a coupling structure for supporting the receptacle at a predetermined working angle relative to the panel and for movement relative to the panel along an arcuate path between a loading position relatively proximate a torso of a user, and an extended position relatively remote from a torso;

wherein the coupling structure comprises an elongate coupling arm having a proximal end supported for pivoting relative to the front panel about an arm pivot axis and a distal end adapted to support the receptacle for pivoting relative to the coupling arm about a receptacle pivot axis.

10. The apparatus of claim 9 further including:

an arm locking component operable to alternatively secure the coupling arm in the extended and loading positions.

11. The apparatus of claim 9 further including:

first and second connecting components are respectively operable to selectively adjust a distance between the panel and the first frame member and a distance between the panel and the second frame member.

12. The apparatus of claim 9 further including:

resilient cushioning material mounted to the frame members and the panel, and adapted to be disposed between the frame assembly and a torso of a user when in the frame assembly working position.

13. The apparatus of claim 9 further including:

a substantially rigid brace member coupled to the curvilinear regions of the first and second frame members and disposed along a back region of a torso when in the frame assembly working position.

14. The apparatus of claim 9 further including:

a fastening component adapted to secure the front panel in said overlying relation to the abdominal region.

15. The apparatus of claim 14 wherein:

the fastening component comprises a substantially inextensible strap arrangement adapted to substantially surround a torso.

16. The apparatus of claim 9 further including:

a receptacle locking component operable to adjustably set an angular position of the receptacle with respect to the coupling arm about the receptacle pivot axis.

* * * * *